United States Patent
Maichl et al.

(10) Patent No.: US 9,886,041 B2
(45) Date of Patent: Feb. 6, 2018

(54) METHOD FOR CONFIGURING A FLUID CONTROL UNIT, COMPUTER PROGRAM PRODUCT AND FLUIDIC SYSTEM

(75) Inventors: Martin Maichl, Salach (DE); Michael Berner, Kirchheim (DE)

(73) Assignee: FESTO AG & CO. KG, Esslingen (DE)

( * ) Notice: Subject to any disclaimer, the term of this patent is extended or adjusted under 35 U.S.C. 154(b) by 689 days.

(21) Appl. No.: 14/372,318

(22) PCT Filed: Jan. 18, 2012

(86) PCT No.: PCT/EP2012/000189
§ 371 (c)(1),
(2), (4) Date: Jul. 15, 2014

(87) PCT Pub. No.: WO2013/107466
PCT Pub. Date: Jul. 25, 2013

(65) Prior Publication Data
US 2014/0336829 A1  Nov. 13, 2014

(51) Int. Cl.
*G05D 7/06* (2006.01)
*F15B 13/08* (2006.01)
*F15B 21/08* (2006.01)

(52) U.S. Cl.
CPC ....... *G05D 7/0617* (2013.01); *F15B 13/0853* (2013.01); *F15B 21/08* (2013.01)

(58) Field of Classification Search
None
See application file for complete search history.

(56) References Cited

U.S. PATENT DOCUMENTS

| 5,182,908 A | 2/1993 | Devier et al. |
| 8,895,311 B1* | 11/2014 | Handique ............ B01J 19/0093 422/502 |
| 2006/0113322 A1* | 6/2006 | Maser ................... B08B 9/0325 222/129.1 |
| 2009/0129941 A1* | 5/2009 | Haas ....................... F04B 15/08 417/42 |
| 2009/0255245 A1* | 10/2009 | Wu ......................... F15B 1/021 60/327 |

(Continued)

FOREIGN PATENT DOCUMENTS

| DE | 102007009677 | 9/2008 |
| EP | 1975418 | 10/2008 |
| WO | WO2004/016900 | 2/2004 |

*Primary Examiner* — Tuan Dao
(74) *Attorney, Agent, or Firm* — Hoffmann & Baron, LLP

(57) ABSTRACT

A method for configuring a fluid control unit including the provision of a processing device with information on the fluid control unit, the moving device and fluid control valves, the determination of possible basic states of the moving device for the fluid control valves and/or of possible movement sequences, and the selection of a basic state and/or of a movement sequence by a user, the transmission, of a respective configuration file to the fluid control unit including open- and/or closed-loop control parameters for the selection of the fluid control valves, the use of the open- and/or closed-loop control parameters from the configuration file in the fluid control unit for selecting the fluid control valves for setting the selected basic state and/or for carrying out the selected movement sequence.

17 Claims, 1 Drawing Sheet

(56) References Cited

U.S. PATENT DOCUMENTS

2013/0036736 A1\* 2/2013 Hart ................. F01K 3/185
                                                  60/645
2013/0103989 A1\* 4/2013 Jensen ............. G06F 11/0793
                                                 714/47.2

\* cited by examiner

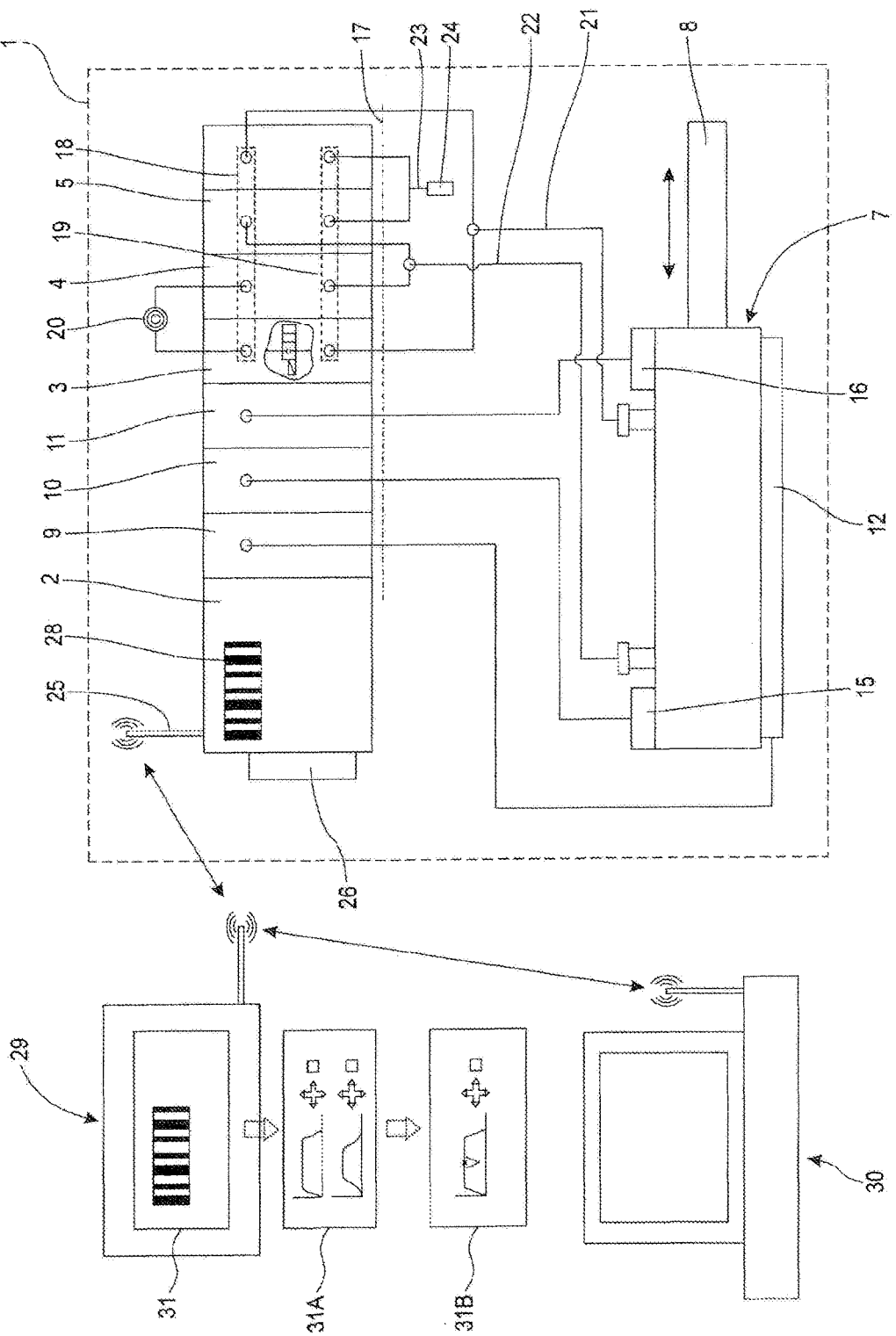

METHOD FOR CONFIGURING A FLUID CONTROL UNIT, COMPUTER PROGRAM PRODUCT AND FLUIDIC SYSTEM

This application claims priority based on an International Application filed under the Patent Cooperation Treaty, PCT/EP2012/000189, filed Jan. 18, 2012.

BACKGROUND OF THE INVENTION

The invention relates to a method for configuring a fluid control unit designed for the selection of fluid control valves for a fluid-operated moving device. The invention further relates to a computer programme product and to a fluidic system.

A method for configuring a fluid control unit, which is known to the applicant but not available in the form of a printed publication, provides that the user initially identifies the available components, i.e. in particular the fluid control unit, the fluid control valves and the moving device, individually. In subsequent steps, the switching and/or actuating times for the desired movement sequence of the moving device are entered by the user into a programming device for the individual fluid control valves and then transmitted by the programming device to the fluid control unit in the form of open- and/or closed-loop control parameters. For this programming operation, the user has to have a good knowledge of the behaviour of the moving device and the fluid control valves used, in particular in the case of more complex movement sequences.

SUMMARY OF THE INVENTION

The invention is based on the problem of providing a method for configuring a fluid control unit, a computer programme product and a fluidic system which enable even an inexperienced user to complete a fast and reliable configuration process.

For a method for configuring a fluid control unit of the type referred to above, this problem is solved by the features of claim 1. According to this, the following steps are provided:

The provision of a processing device with information on the fluid control unit and on the moving device to be controlled by the fluid control unit and on the fluid control valves connected to the moving device.

The determination and indication of possible basic states of the moving device and/or of possible movement sequences for the moving device, using the information provided on the fluid control unit and on the moving device and on the fluid control valves.

The selection of a basic state of the moving device and/or of a movement sequence by a user by means of input at the processing device.

The provision and transmission, from the processing device to the fluid control unit, of a configuration file specific to the selected basic state of the moving device and/or the selected movement sequence, the configuration file including open- and/or closed-loop control parameters for the selection of the fluid control valves for setting the selected basic state for the moving device and/or for carrying out the selected movement sequence.

The use of the open- and/or closed-loop control parameters from the configuration file in the fluid control unit for selecting the fluid control valves for setting the selected basic state for the moving device and/or for carrying out the selected movement sequence.

The indication of possible basic states of the moving device for the fluid control valves and/or of possible movement sequences for the moving device and a possible selection by the user are initially subject to the precondition that the processing device is supplied with suitable information on the fluid control unit, the fluid control valves and the moving device. By way of example, it may be provided that the user provides this information by inputting the type numbers of the existing components, or that he selects the components from one or more component lists which are stored in the processing device or can be retrieved from elsewhere, in particular from an internet server.

In a subsequent step, the possible basic states of the moving device for the fluid control valves and/or the possible movement sequences for the moving device are determined and indicated by the processing device, using the information provided on the fluid control unit and the movement device and the fluid control valves.

The basic states of the moving device, i.e. the possible positions the moving device could adopt when the fluidic system is started up, are based on valve basic states. The valve basic states are those switching and actuating states for each of the fluid control valves which should exist when the fluidic system comprising the fluid control unit, the fluid control valves and the moving device is switched on, in order to ensure a safe start-up of the fluidic system. In the simplest case, the valve basic states correspond to those preferred positions of the fluid control valves which they adopt if the fluid control valves are not supplied with energy, in particular with electric power. In practical applications, however, it may be necessary to move at least one fluid control valve actively into a functional position different from its preferred position in the switching-on process. This typically requires an energy supply, for example the application of electric energy, to enable the moving device to adopt a presettable basic state. This electric energy is supplied by the fluid control unit, which has to be programmed or parameterised accordingly.

According to the invention, this programming or parameterisation process follows the step of the determination and indication of the basic states of the moving device in the processing device and is the result of the selection of one or more basic states of the moving device by the user. The user may for example operate an inputting device such as a keyboard or a touch-sensitive screen on the processing device in order to make the desired inputs for selecting the basic state(s) determined and indicated by the processing device. A direct programming or parameterisation of the basic states by the user, however, is not provided for, but the programming or parameterisation is carried out in a step to be described in greater detail below after the user has selected the desired basic state(s) with the aid of the processing device.

Concerning the possibly required selection of movement sequences for the moving device, a similar procedure can be provided. After the components of the fluidic system have been determined, the processing device can in a subsequent step—with reference to the properties assigned to the respective components—determine the movement sequences which can be carried out by the moving device using the available components. For a pneumatic linear actuator like a pneumatic cylinder with a sliding piston rod, for example, it may be provided that a first movement sequence is initially selected for the extension movement of the piston rod. For this purpose, the processing device may, by way of example, show to the user a selection of different motion sequences, such as extension without braking, braked extension, extension with controlled force, an at least nearly zero-force extension for testing and adjustment purposes and/or start- and/or end position-cushioned extension, and offer these to the user in the form of graphical symbols, enabling the user to make a selection without having any underlying knowledge of the pneumatic interaction between the components. In a subsequent second step, the duration of the extension process and the force to be applied by the piston rod can then be set. For the retraction of the piston rod, a selection can be made from identical or similar movement sequences. Depending on the design of the components of the fluidic system, there may, for example, be further aspects, such as a cushioned or uncushioned approach to an intermediate position, which may be preset by the processing device and selected by the user, for example using graphical symbols on a display unit of the processing device.

In a subsequent step, following the selection of the basic state of the moving device and/or the movement sequence by the user by means of inputs into the processing device, the processing device creates the configuration file specific to the selected basic state of the movement device and/or to the selected movement sequence; this file contains the open- and/or closed-loop control parameters for the selection of the fluid control valves for carrying out the selected movement sequence. This configuration file is then transmitted to the fluid control unit by the processing device. The user is therefore not confronted by fluidic details of the fluidic system to be controlled, but can select the basic state and/or movement sequence appropriate for the respective application in a simple way by using the processing device. Both the analysis of the possible basic states and movement sequences and the parameterisation of the fluidic system on the basis of the selected basic states and movement sequences are completed by the processing device without any further action of the user.

The open- and/or closed-loop control parameters from the configuration file are then available to the fluid control unit in order to select the fluid control valves for setting the selected basic state of the moving device and/or for carrying out the selected movement sequence.

Using the processing device, even a less experienced user can therefore programme a preset movement task for the movement device within a short time into the fluid control unit using the processing device and the method according to the invention, thus being able to start the fluidic system.

Advantageous further developments of the invention are specified in the dependent claims.

It is expedient if information on the fluid control unit, the fluid control valves and the moving device to be controlled is made available to the processing device using a coding which is assigned to the fluid control unit and which can preferably read out using wireless means. In this context, it may be provided that in the read-out process information for each component of the fluidic system is individually made available to the processing device, for example by reading out wireless-readable radio tags (RFID tags) assigned to the individual components. In this case, it may be necessary—depending on the number and design of the available components of the fluidic system—to instruct the user to specify the connection/linkage between the respectively determined component and other components while inputting the component in question or in a subsequent step.

Alternatively, it may be provided that the components of the fluidic system, i.e. the fluid control unit, the fluid control valves and the moving device, are designed as a ready-made assembly produced in the factory, in which case the reading of individual part or order numbers or another identification of the assembly would be sufficient for unique identification of the assembly as a whole in the processing device. The coding is preferably optically readable, in particular in the manner of a bar code or a data matrix, which can be read out using a camera and downstream image processing software, which are preferably integrated into the processing device.

It is advantageous if the processing device retrieves the information on the fluid control unit, the fluid control valves and the moving device from a preferably external data base using the read-out coding, in particular via a hard-wired or wireless link. This enables the processing unit to compile the information required for determining the possible basic states for the moving device and/or the possible movement sequences. It is advantageous if this information can be drawn from an external data base, because in this case the storage space in he processing device can be kept small. The information is preferably retrieved from an external data base by wireless means, for example via an infrared or mobile radio telephone link, in particular in accordance with the IRDA standard for infrared links or, by way of example, in accordance with one of the mobile radio telephone standards GSM, GPRS, EDGE, UMTS, HSPA or LTE.

In a further development of the invention, it is provided that the processing device retrieves the possible basic states of the moving device and/or the possible movement sequences and/or the associated open- and/or closed-loop control parameters for the fluid control unit and the fluid control valves and moving device connected thereto from a preferably external data base via a hard-wired or wireless link. This further reduces the required storage space and the calculating power required in the processing device for the determination of possible basic states of the moving device and/or the possible movement sequences.

For at least one of the possible movement sequences indicated by the processing device, at least one movement parameter which can be adjusted by the user and/or an additional movement option is/are preferably selectable, and or the movement parameter and/or the movement option is/are included as additional parameter(s) in the open- and/or closed-loop control parameters for the fluid control unit following their adjustment and/or selection. By way of example, the additional movement parameter may be a maximum acceleration and/or speed for the selected movement sequence. The additional movement option may for example be a central position or an intermediate position for a movement of a linear actuator between two end positions. Following their selection by the user, these additional movement parameters/movement options are integrated into the configuration file and then made available to the fluid control unit.

In an advantageous further development of the method, it is provided that the processing device indicates at least one movement sequence which requires an addition of at least one component presettable by the processing device, in particular a sensor component, to the fluid control unit and/or to the fluid control valves and/or to the moving device and is selectable at the processing device as a user-adjustable additional movement option and, after selection, included in the open- and/or closed-loop control parameters for the fluid control unit. It may for example be provided that the additional movement option is indicated on the display device of the processing device with a prompt that enabling and use are currently not possible and that a further component has to be obtained and installed first, after which the desired movement option can be enabled and used. Alternatively, it can be provided that the user, by means of an appropriate input, presets a basic state and/or a movement sequence for the fluidic system and the processing device performs the relevant programming or parameterisation to suit the design of the fluidic system or prompts the user that one or more components have to be obtained and installed in order to enable the desired basic state and/or movement sequence. In addition or as an alternative, it may be provided that the processing device initially only specifies a few base functions for basic states and/or movement sequences and releases further functions which can be carried out with or without further components for use following their enablement subject to costs.

By such measures, the user can be offered an increase/expansion of the available powers of the fluidic system which is easily executed. The user can for example be offered a speed-controlled movement of the movement device if he agrees to complete the movement device by adding a suitable sensor for speed selection.

It is expedient if a component information, such as a part number, is output to the user when selecting the movement sequence which requires an addition of at least one component presettable by the processing device, in particular a sensor component, to the fluid control unit and/or to the fluid control valves and/or to the moving device. This enables the user in a particularly simple way to implement the possibly desired increase/expansion of the available powers of the fluidic system. In a particularly preferred embodiment, it is provided that the processing device can, immediately after being enabled by the user, trigger an order of the missing component, for example by a wireless transmission of the order to the supplier of the missing component. It may further be provided that the supplier of the missing component provides with the delivery of the component a tag or another representation for the changed coding of the fluidic system, to enable the user to input the expansion of the functionality into the processing device by simple means.

In a further development of the invention, it is provided that the fluid control unit transmits the basic state of the moving device and/or the movement sequence preset by the processing device and/or at least a part of the open- and/or closed-loop control parameters to a higher-order control unit, in particular a programmable controller. In this way, the higher-order control unit, which may for example be a programmable controller, can be informed by simple means how the fluid control unit was configured, in order to adapt, if necessary, the control commands to be transmitted by the control unit to the fluid control unit. Preferably, a direct communication is provided between the fluid control unit and the higher-order control unit, preferably via a bus system, in particular a wireless bus system.

According to a further aspect of the invention, a storage medium with a computer programme product is provided, which is designed for the execution of steps of the method according to any of the preceding claims. The computer programme product preferably comprises all input and processing steps required for executing the method according to any of claims 1 to 8. The computer programme product is preferably stored on an internet server and can be transmitted by a user, via a hard-wired or wireless data link, to a processing device designed as a user terminal, such as a personal computer, in particularly in the form of a tablet computer or a smart phone, in order to be stored there as well in a storage medium such as an internal memory. Even now, such user terminals are typically equipped such as to enable the user to carry out all of the steps required for execution in accordance with the computer programme product. These in particular include the step of the provision of information on the fluid control unit, the fluid control valves and the moving device to be selected, using a presettable coding, for example with the aid of a built-in camera and an image processing software module, which may either be a part of the computer programme product or is instructed by the computer programme product in order to resolve the coding and to gain information on the components of the fluidic system. They further include the step of displaying the possible basic states of the moving device and/or movement sequences, which can be displayed visually to the user by means of a suitable screen. In addition, an internal transceiver device may be provided, by means of which data can be exchanged with the fluidic system and/or an external database, in particular via a wireless internet link. Such user terminals usually further include suitable inputting means for user inputs, for example in the form of a keyboard or a touch-sensitive screen.

According to a further aspect of the invention, a fluidic system comprising a fluid control unit, fluid control valves and a moving device as well as a processing device is provided, wherein the fluid control unit is designed for the selection of the fluid control valves and the fluid control valves are designed for a fluidic control of the moving device and wherein the processing device is designed for the determination and processing of information on the fluid control unit, the moving device and the fluid control valves, wherein the processing device is designed for a determination and indication of possible basic states for the moving device and/or of possible movement sequences for the moving device, using the information provided on the fluid control unit, the moving device and the fluid control valves, and for a selection of a basic state for the moving device and/or of a movement sequence by the user by means of input at the processing device, as well as for a provision and transmission to the fluid control unit of a configuration file specific to the selected valve basic state and/or the selected movement sequence, the configuration file comprising open- and/or closed-loop control parameters for the selection of the fluid control valves for carrying out the selected movement sequence.

In a further development of the fluidic system, it is provided that the processing device is structurally integrated into the fluid control unit. This allows the fluidic system to be designed with a particularly compact structure. In this context, a hard-wired or wireless data transmission can be provided between the processing device and the fluid control unit.

BRIEF DESCRIPTION OF THE DRAWING

The execution of the method according to the invention is described with reference to the drawing, of which:

FIG. 1 is a diagrammatic representation of a fluidic system comprising a fluid control unit, a plurality of fluid control valves and a fluid-operated moving device.

DETAILED DESCRIPTION OF THE PREFERRED EMBODIMENTS

The illustrated embodiment of a fluidic system 1 as shown in FIG. 1 comprises a fluid control unit 2, a plurality of fluid control valves 3, 4, 5, 6 and fluid-operated moving device 7. The moving device 7 of the illustrated embodiment is designed as a pneumatic cylinder and comprises a sliding piston rod 8 capable of linear displacement between an inoperative position not shown in the drawing and an operating position shown in FIG. 1. The fluidic system 1 further comprises a plurality of input/output modules 9, 10, 11, which in the illustrated embodiment are electrically connected to a position sensor 12 and/or to end position sensors 15, 16.

In the illustrated embodiment, it is provided that the fluid control unit 2, the fluid control valves 3, 4, 5 and 6 and the input/output modules 9, 10, 11 are lined up along a line-up axis 17 and electrically coupled to one another in a way not shown in detail, for example via an internal bus communication system or an electric multipole connection.

Each of the fluid control valves 3, 4, 5 and 6 has an input port 18 and an output port 19. In the illustrated embodiment, the input ports 18 and the output ports 19 of the fluid control valves 3, 4, 5 and 6, which are designed as 2/2-way valves by way of example, are connected to one another in a way to be specified below, in order to form a full-bridge arrangement which offers a variety of different selection opportunities for supplying the moving device 7 with fluid and for carrying out the desired movement sequences. Other valve variants, such as 3/3-way valves, can be used in addition or as an alternative.

In the case of the fluid control valves 3, 4, 5 and 6 of the illustrated embodiment, the first input ports 18 of the first and second fluid control valves 3, 4 are connected to a fluid source 20, in particular a compressed air source. The output port 19 of the first fluid control valve 3 and the input port 18 of the fourth fluid control valve 6 are connected to a first working passage 21, which is in turn fluidically connected to a working chamber not shown in detail of the moving device 7. The output port 19 of the second fluid control valve 4 and the input port 18 of the third fluid control valve 5 are connected to a second working passage 22, which is in turn fluidically connected to a second working chamber not shown in detail of the moving device 7. The output ports 19 of the third and fourth fluid control valves 5, 6 are connected to a venting passage 23, the end of which is provided with a silencer 24 in the illustrated embodiment.

The fluid control unit 2 of the illustrated embodiment is provided with a radio device 25 designed for wireless data reception, for example for the reception of a configuration file. The fluid control unit 2 further comprises a bus interface 26 for a hard-wired or wireless data transmission link to a bus system not shown in the drawing and to a likewise not illustrated higher-order control unit, in particular a programmable controller. In an embodiment not shown in the drawing, it is provided that a higher-order control unit is designed for a hard-wired of wireless reception of the configuration file and that the configuration file, after being received by the control unit, is transferred to the fluid control unit via the bus system.

For the configuration of the fluid control unit 2, the following procedure is provided. First, a user activates a processing device 29, which in the illustrated embodiment is a smartphone, i.e. a mobile telephone with an integrated computer, for the execution of the method. For this purpose, the user can store a computer programme product, i.e. a software module, in the processing device 29, which module can for example be retrieved via a mobile radio link from a server 30 likewise designed as a computer. The computer programme product is then stored in the processing device 29 and, if required, installed into the processing device 29. In a first process step, the user can then input information on the fluid control unit 2, the fluid control valves 3, 4, 5 and 6 and the moving device 7 into the processing device 29. In the illustrated embodiment, a bar code 28 on the fluid control unit 2 is photographed by a camera incorporated into the processing device 29 and not shown in detail. This is symbolised by the representation of the screen 31 of the processing device.

In a subsequent process step, the bar code 28 is converted by the processing device 29 into a numeric code in accordance with a predetermined convention, and this numeric code is then transmitted by the processing device 29 to the server 30 by wireless transfer. Depending on the configuration of the computer programme product running on the processing device 29, the server 30 can make the information on the fluidic system 1 available to the processing device 29 from a data base. In this case, possible basic states of the moving device 7 and/or possible movement sequences for the moving device 7 are determined in the processing device. Alternatively, the server 30 makes available to the processing device 29 the possible basic states of the moving device 7 and the valve basic states of the fluid control valves 3, 4, 5 and 6, which are linked to the former, and/or the possible movement sequences for the moving device 7 from a data base.

In any case, in a next step the possible basic states of the moving device 7, which are based on the linked valve basic states of the fluid control valves 3, 4, 5 and 6, and/or the possible movement sequences for the moving device 7 are represented on the individually shown screen 31A in the form of time-and-motion diagrams. Other types of graphical representation and/or of the input of the basic states and the movement sequences can be provided additionally or as an alternative.

Depending on the task to be performed by the moving device 7, the user can now make a selection from the displayed possible basic states of the moving device 7 and/or the possible movement sequences for the moving device 7. For this purpose, the user can for example make a selection at the touch-sensitive screen 31/31A of the processing device 29. The user can further influence the movement sequence, for example the duration of the extension process and/or the maximum extension speed, in a simple way by using the arrow key shown on the screen 31A. To select the respective movement sequence, the user selects an actuating box which is placed adjacent to the respective arrow key on the screen 31A in the illustrated embodiment. Screen 31B then only shows the selected movement sequence. Here, the user can further influence the movement sequence by using the arrow key, for example for a temporary speed reduction for the extension process, and after the movement sequence has been defined, the actuating box can again be selected in order to terminate the selection process. In the same or a similar way, the user can perform the configuration of the retraction process for the piston rod 8.

The processing device 29 then generates, either by internal data processing or by data exchange with the server 30, a configuration file specific to the selected basic state of the moving device 7 and/or the selected movement sequence for the fluid control unit 2 and transmits this to the fluid control unit 2, preferably by wireless means. For this purpose, the radio device 25 of the fluid control unit 2, which may for example be designed as a short-range radio device conforming to the Bluetooth standard, can be used. The configuration file in particular contains the open- and/or closed-loop control parameters for the selection of the fluid control valves 3, 4, 5 and 6 for setting the selected basic position of the movement device with reference to the linked valve basic states and/or for the execution of the selected movement sequence by the moving device.

In a further step, the open- and/or closed-loop control parameters from the configuration file in the fluid control unit 2 are used for selecting the fluid control valves 3, 4, 5 and 6 for setting the selected basic state of the movement device 7 and/or for the execution of the selected movement sequence.

In addition, it can be provided that the fluid control unit 2 transmits the basic state of the moving device 7 as preset by the processing device 29 and/or the selected movement sequence and/or at least parts of the open- and/or closed-loop control parameters via the bus interface 26 to a higher-order control unit, in order to enable the latter to take into account the selected behaviour of the fluidic system 1 when generating control commands for the fluidic system 1 and/or for other components to be controlled.

The invention claimed is:

1. A method for configuring a fluid control unit designed for the selection of fluid control valves for a fluid-operated moving device, the method comprising the steps of: the provision of a processing device with information on the fluid control unit and on the moving device to be controlled by the fluid control unit and on the fluid control valves connected to the moving device, the determination and indication of possible movement sequences for the moving device, using the information provided on the fluid control unit and on the moving device and on the fluid control valves, and the selection of a movement sequence by a user by means of input at the processing device, the provision and transmission, from the processing device to the fluid control unit, of a configuration file specific to the selected movement sequence, the configuration file including open- and/or closed-loop control parameters for the selection of the fluid control valves for carrying out the selected movement sequence, the use of the open- and/or closed-loop control parameters from the configuration file in the fluid control unit for selecting the fluid control valves for carrying out the selected movement sequence.

2. A method according to claim 1, wherein information on the fluid control unit, the fluid control valves and the moving device to be controlled is made available to the processing device using a coding which is assigned to the fluid control unit and which can be read out by the processing device using wireless means.

3. A method according to claim 2, wherein the processing unit retrieves the information on the fluid control unit, the fluid control valves and the moving device from an external data base using the read-out coding via a hard-wired or wireless link.

4. A method according to claim 1, wherein the processing device retrieves the possible movement sequences and/or the associated open- and/or closed-loop control parameters for the fluid control unit and the fluid control valves and moving device connected thereto from an external data base, via a hard-wired or wireless link.

5. A method according to claim 1, wherein, for at least one of the possible movement sequences indicated by the processing device, at least one movement parameter which can be adjusted by the user and/or an additional movement option is/are selectable, and the movement parameter and/or the movement option is/are included as additional parameter(s) in the open- and/or closed-loop control parameters for the fluid control unit following their adjustment and/or selection.

6. A method according to claim 1, wherein the processing device indicates at least one movement sequence which requires an addition of at least one component presettable by the processing device, the at least one component being a sensor component, to the fluid control unit and/or to the fluid control valves and/or to the moving device and which is selectable at the processing device as a user-adjustable additional movement option and, after selection, included in the open- and/or closed-loop control parameters for the fluid control unit.

7. A method according to claim 6, wherein a component information, such as a part number, is output to the user when selecting the movement sequence which requires an addition of at least one component presettable by the processing device, the at least one component being a sensor component, to the fluid control unit and/or to the fluid control valves and/or to the moving device.

8. A method according to claim 1, wherein the fluid control unit transmits the movement sequence preset by the processing device and/or at least a part of the open- and/or closed-loop control parameters to a higher-order control unit, in particular a programmable controller.

9. A computer program product embodied on a non-transitory distribution medium readable by a computer and comprising program instructions which, when executed by the computer, perform a computer process comprising the method according to claim 1.

10. A method for configuring a fluid control unit designed for the selection of fluid control valves for a fluid-operated moving device, the method comprising:
providing a processing device with information on the fluid control unit and on the moving device to be controlled by the fluid control unit and on the fluid control valves connected to the moving device;
determining and indicating possible basic states of the moving device using the information provided on the fluid control unit and on the moving device and on the fluid control valves;
selecting a basic state of the moving device by a user by means of input at the processing device;
providing and transmitting, from the processing device to the fluid control unit, a configuration file specific to the selected basic state of the moving device, the configuration file including open- and/or closed-loop control parameters for the selection of the fluid control valves for setting a basic position of the moving device based on the selected basic state;
using the open- and/or closed-loop control parameters from the configuration file in the fluid control unit for selecting the fluid control valves for setting the selected basic state for the moving device;
determining and indicating possible movement sequences for the moving device, using the information provided on the fluid control unit and on the moving device and on the fluid control valves;
selecting a movement sequence by a user by means of input at the processing device;
providing and transmitting, from the processing device to the fluid control unit, a configuration file specific to the selected movement sequence, the configuration file including open- and/or closed-loop control parameters for the selection of the fluid control valves for carrying out the selected movement sequence; and
using the open- and/or closed-loop control parameters from the configuration file in the fluid control unit for selecting the fluid control valves for carrying out the selected movement sequence.

11. The method according to claim 10, further comprising:
obtaining information on the fluid control unit, the fluid control valves and the moving device to be controlled by wirelessly reading a coding on the control unit with the processing device.

12. The method according to claim 11, further comprising:
retrieving external information on the fluid control unit, the fluid control valves and the moving device from an external data base using the read-out coding via a hard-wired or wireless link.

13. The method according to claim 10, wherein the processing device retrieves the possible basic states of the moving device and/or the possible movement sequences and/or the associated open- and/or closed-loop control parameters for the fluid control unit and the fluid control valves and moving device connected thereto from an external data base, via a hard-wired or wireless link.

14. The method according to claim 10, wherein, for at least one of the possible movement sequences indicated by the processing device, at least one movement parameter which can be adjusted by the user and/or an additional movement option is/are selectable, and the movement parameter and/or the movement option is/are included as additional parameter(s) in the open- and/or closed-loop control parameters for the fluid control unit following their adjustment and/or selection.

15. The method according to claim 10, wherein the processing device indicates at least one movement sequence which requires an addition of at least one component presettable by the processing device, the at least one component being a sensor component, to the fluid control unit and/or to the fluid control valves and/or to the moving device and which is selectable at the processing device as a user-adjustable additional movement option and, after selection, included in the open- and/or closed-loop control parameters for the fluid control unit.

16. A fluidic system comprising a fluid control unit, fluid control valves and a moving device as well as a processing device, wherein the fluid control unit is designed for the selection of the fluid control valves and the fluid control valves are designed for a fluidic control of the moving device, and wherein the processing device is designed for the determination and processing of information on the fluid control unit, the moving device and the fluid control valves and wherein, the processing device is designed for a determination and indication of possible movement sequences for the moving device, using the information provided on the fluid control unit, the moving device and the fluid control valves, and for a selection of a movement sequence by the user by means of input at the processing device, as well as for a provision and transmission to the fluid control unit of a configuration file specific to the selected movement sequence, the configuration file comprising open- and/or closed-loop control parameters for the selection of the fluid control valves for carrying out the selected movement sequence.

17. The fluidic system according to claim 16, wherein the processing device is structurally integrated into the fluid control unit.

* * * * *